United States Patent [19]

Yamashita

[11] Patent Number: 4,549,454

[45] Date of Patent: Oct. 29, 1985

[54] METHOD FOR CUTTING AND SUPPLYING LABELS OF VARIOUS SHAPES

[75] Inventor: Kyouichi Yamashita, Kanagawa, Japan

[73] Assignee: Koyo Jidoki Co., Ltd., Kanagawa, Japan

[21] Appl. No.: 640,622

[22] Filed: Aug. 14, 1984

[30] Foreign Application Priority Data

Aug. 22, 1983 [JP] Japan ................................ 58-151596

[51] Int. Cl.[4] ......................... B32B 31/00; B26D 9/00

[52] U.S. Cl. ........................................... 83/27; 83/40; 83/152; 83/300; 83/405; 156/510; 156/521; 156/DIG. 11; 156/DIG. 33

[58] Field of Search ....................... 83/40, 152, 98-100, 83/300, 405, 27; 156/521, 510, 511, 513, 523, 524, 256, 261, 263, DIG. 11, DIG. 33

[56] References Cited

U.S. PATENT DOCUMENTS 3,823,050 7/1974 Mers ............................... 156/521 X
3,883,388 5/1975 Amberg et al. ................. 156/510 X
4,181,555 1/1980 Hoffmann ........................ 156/521 X

*Primary Examiner*—James M. Meister
*Attorney, Agent, or Firm*—Sughrue, Mion, Zinn, Macpeak, and Seas

[57] ABSTRACT

A strip of tape is cut at intervals into precise cut lengths equal in length to that of a desired label of non-rectangular shape. The cut lengths of tape are positioned in exact alignment with a punch of a punch cutting assembly for punching out the label and the punched label is separated from waste about the rim of the label for delivery free of the waste. The cut lengths are transferred to a transfer drum periphery and held momentarily under vacuum pressure which vacuum pressure is released to allow the cut lengths to shift circumferentially about the periphery of the transfer drum against a stop to accurately locate the cut lengths prior to further transfer to the punch cutting assembly.

4 Claims, 8 Drawing Figures

FIG. 2
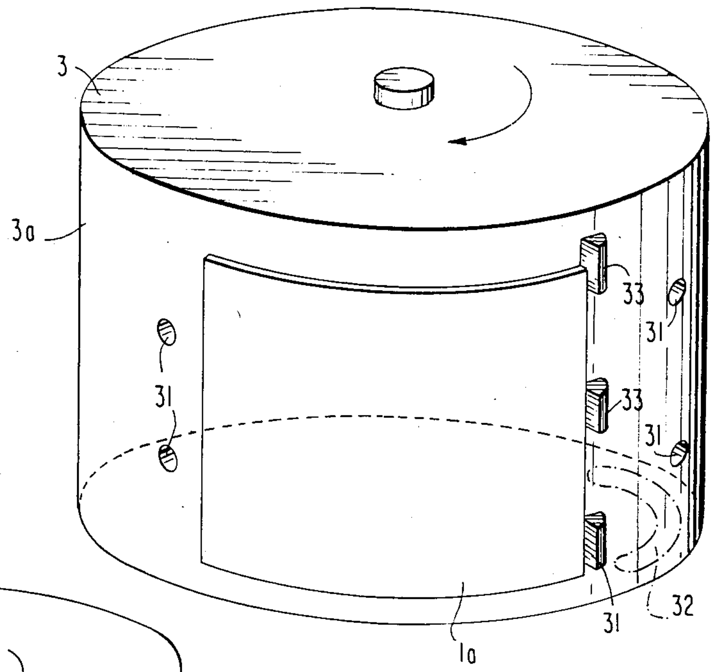
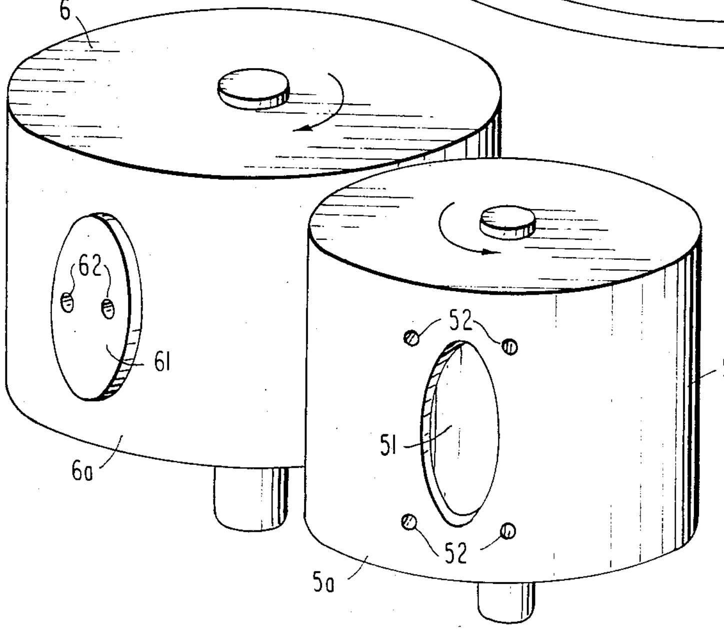
FIG. 3
FIG. 4
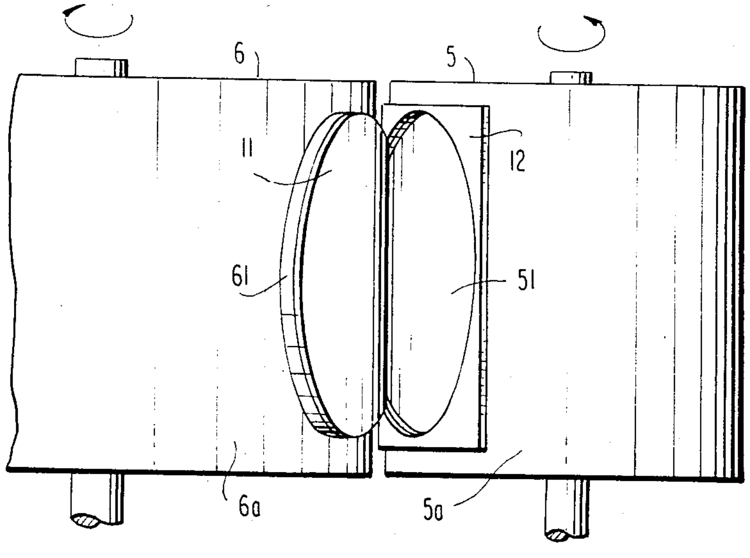

FIG.5
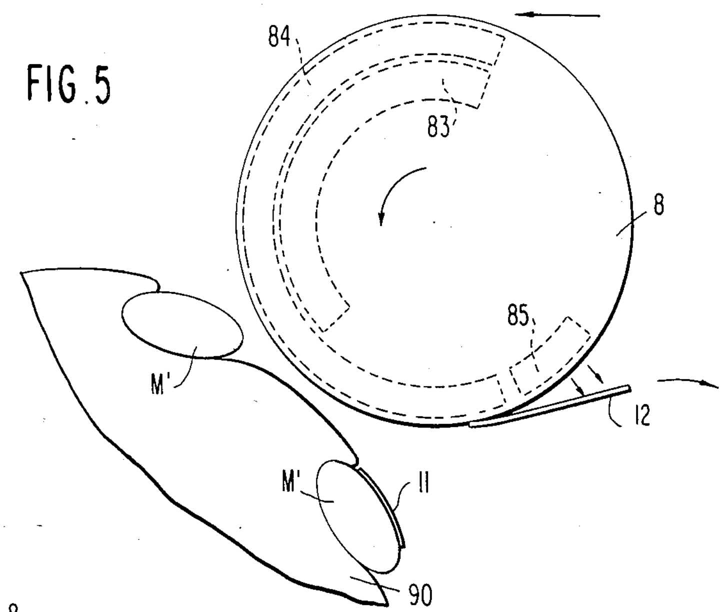
FIG.6
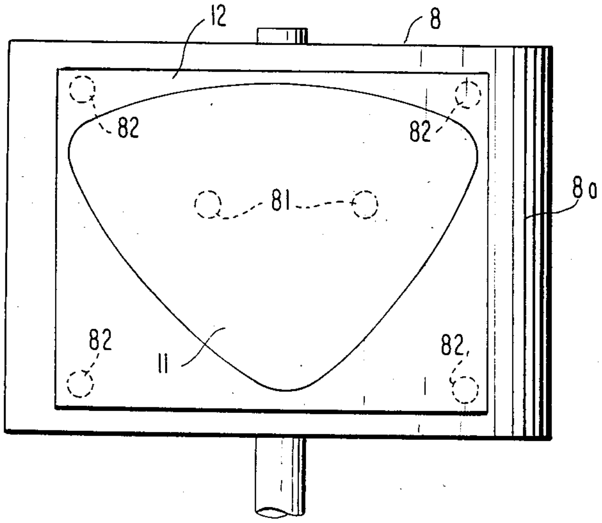
FIG.7
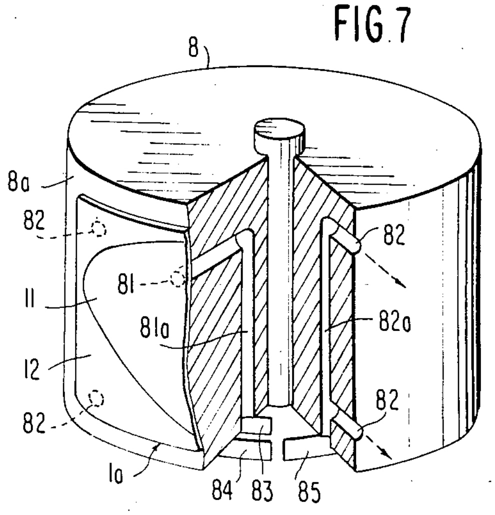
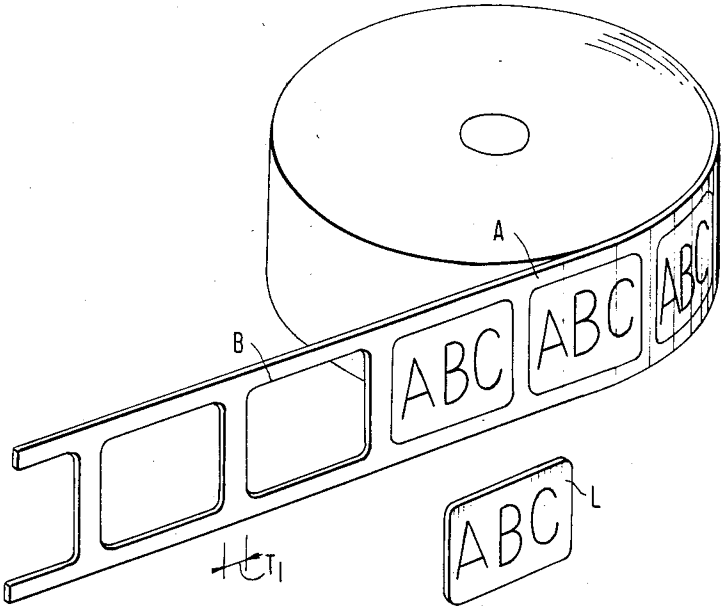
FIG.8
PRIOR ART

METHOD FOR CUTTING AND SUPPLYING LABELS OF VARIOUS SHAPES

FIELD OF THE INVENTION

This invention relates to methods for cutting and supplying labels, and more particularly to a method minimizing the waste in cutting non-rectangular labels from a tape.

BACKGROUND OF THE INVENTION

If a label is square or rectangular, such labels may be simply cut from elongated tapes. This becomes more difficult if the label is round or of other non-rectangular shape. In such cases, a punch-cutting device or assembly is normally employed. However, there is significant waste of the tape. From the point of cost effectiveness, the tape waste has a significant negative influence on production. For a given length of tape, it is advantageous, therefore, to form as many labels from such given length as possible. A consideration, therefore, is the amount of space that is left between the separate punches within a given strip of tape. Small adjustments in the amount of material used to produce a single part of such product has a tangible effect on the material consumption and hence the cost of the product as a whole. Referring to FIG. 8 of the drawings, a label L, which is of generally rectangular configuration but having corners, is shown as punched from the length of tape A and with a series of such labels being sequentially punched in a manner such that there remains a width of waste tape between one punch hole and the next of a width T1. As this width T1 is shortened, there will be a corresponding curtailment in the amount of tape waste B produced as a result of punching.

As a necessary part of the present label cutting and supply system, the remaining portion of the tape constituting the waste is rerolled after passing through the punching device or punching assembly. If the width between each punch and the width between the upper and lower edges of the label L and the waste tape B is reduced by too much, the waste tape will tear as it is being rewound, and the machine will jam.

Present label punching machines must keep the distance between punches and the length between the upper and lower edges of the label and the tape bearing the labels at a level large enough to prevent tearing.

SUMMARY OF THE INVENTION

The present invention is directed to solving the problems without changing or modifying the apparatus for the cutting stage, and the invention is directed to a method for punching out labels successively with minimal or no space between cuts and with minimal or zero space between the upper and lower edges of the tape providing the labels and the labels so produced therefrom. The method is economically superior to that practiced previously. The invention is additionally directed to a method of cutting labels of non-rectangular configuration which includes the steps of accurately and efficiently separating a cut label from the remaining waste about the rim of the cut label, and sending the label and the waste portions of the initial tape to respective succeeding stations in the apparatus practicing the method. The method of cutting such labels is applicable to existing machines constituting label cutters, and a further purpose of the invention is to provide such adpatability to existing label cutting machines.

BRIEF DESCRIPTION OF THE DRAWING

FIG. 2 is a perspective view of a tape cut length position adjusting and transfer drum forming a portion of the system of FIG. 1.

FIG. 3 is a perspective view of the punch-cutter assembly of the system of FIG. 1.

FIG. 4 is a side elevational view of the punch-cutter assembly of FIG. 3.

FIG. 5 is a top plan view of a separation drum in a portion of the paste application device utiliziing an alternative embodiment of the label cutting and supplying method of the present invention.

FIG. 6 is a side elevational view of the separation drum of FIG. 5.

FIG. 7 is a perspective view, partially broken away, to show the vacuum application system to the drum periphery employed by separation drum 8 and similarly employed within other components of the systems illustrated.

FIG. 8 is a perspective view of a roll of tape bearing imprinted labels of non-rectangular configuration with individual labels severed therefrom in the manner of prior art methods.

DESCRIPTION OF THE PREFERRED EMBODIMENT

Figure 1:
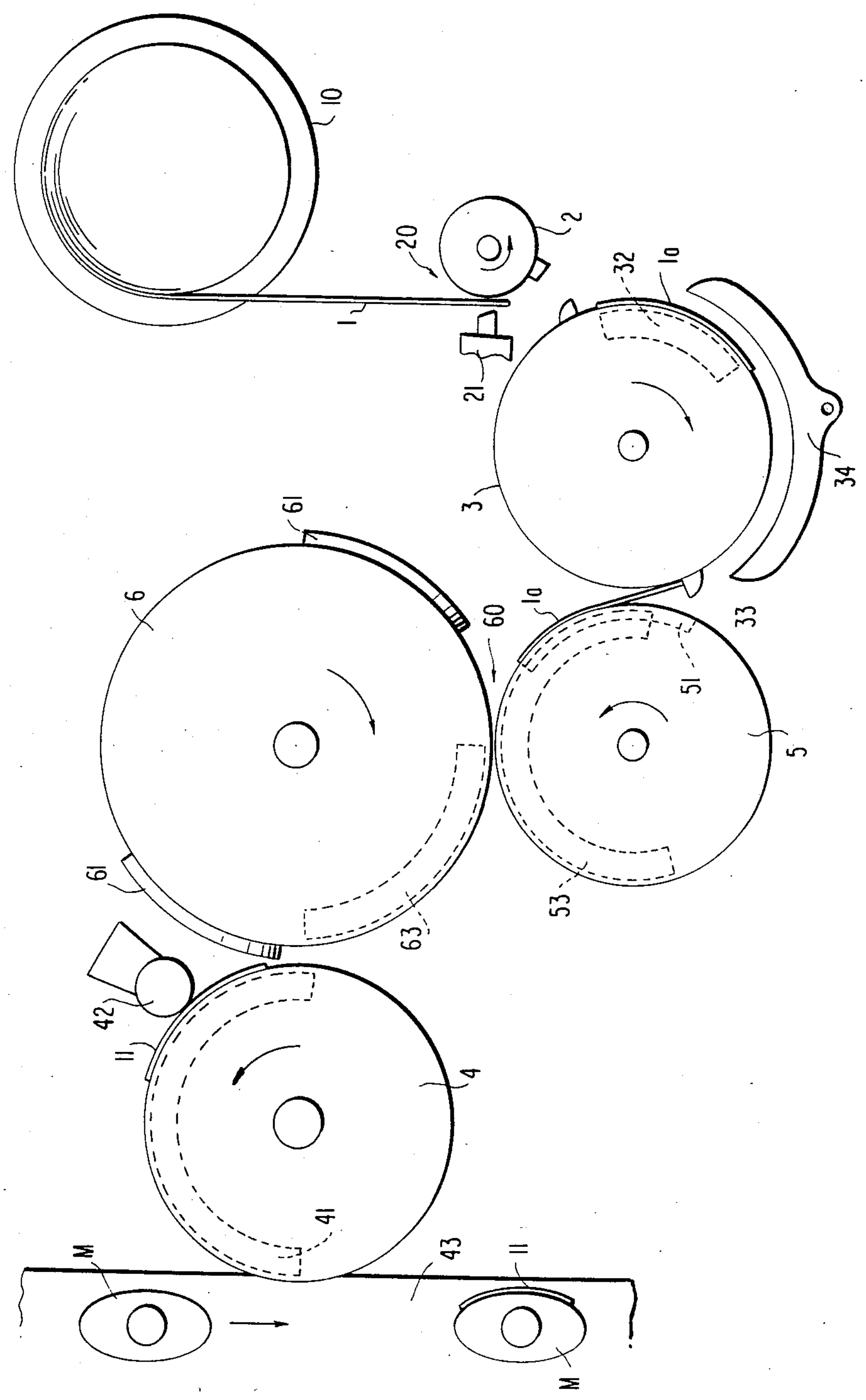
FIG. 1 is a schematic plan view of a label cutting system employing the method constituting a preferred embodiment of the present invention.

Referring to FIG. 1, which shows one example of a label cutting and supplying system utilizing the method of the present invention in a preferred form, a label bearing tape or label tape 1 is illustrated as being fed from a spool and spindle assembly 10 with the leading end of tape 1 being drawn through a cutting assembly defined by rotating cutter 2 which rotates in the direction of the arrow shown and a fixed position cutter 21. As a result, the label bearing tape 1 is severed into cut lengths, as at 1*a* which cut lengths are fed onto an adjusting or transfer drum 3. The position adjusting drum 3 receives the tape cut length 1*a* as it emerges from being freshly cut via the cutting device comprising cutters 2 and 21. Vacuum pressure is applied to the position adjusting drum at its periphery, which vacuum pressure holds the cut length 1*a* in position on the drum periphery. The function of the position adjusting or transfer drum 3 is to adjust the position of the tape cut length 1*a*, while transporting that cut length to the downstream punching assembly.

By further reference to FIG. 2, it is seen that several vacuum holes as at 31 open to the cylindrical surface or periphery 3*a* defined by connecting passages (not shown) but identical to that of FIG. 7 which extend a short distance radially towards the center of the drum 3 and then make a right angle turn and extend vertically downwardly to the lowermost part of the drum 3, finally opening onto the drum bottom surface. A vacuum source hole, indicated in dotted lines at 32, FIG. 2, is of elongated arcuate configuration, facing the bottom of drum 3, beginning from the tangent point defined by the point of first contact between the tape cut length 1*a* and the periphery 3*a* of the drum and following the curve of the drum cylindrical wall to a point shortly therebeyond. The vacuum holes 31 extend from their positions on the cylindrical periphery 30*a* of drum 3 via the passages (not shown) to the bottom of the cylinder opening at such radial positions so as to pass directly over the vacuum source hole 32 as the drum 3 rotates.

As indicated, a plurality of claws 33 are fixed to the periphery or face 3*a* of the drum and extend radially outwardly thereof. Referring back to FIG. 1, at a position slightly spaced from the periphery of the drum 3, is an arcuate guide wall 34 which is so positioned as to prevent the tape cut length 1*a* from flying awy from the drum surface during rotation. The transport of the tape cut length 1*a* by drum 3 is so designed that the cut length will adhere to the drum surface for only a minimal time. If the position of the tape cut length 1*a* in relationship to the drum and the subsequent cutting station is not accurately fixed at this point, it may be adjusted (as will be subsequently explained) by drum 3 prior to delivery to the next station in which punching of the label occurs. As may be appreciated the tape cut length 1*a* may shift slightly on the periphery 3*a* of the drum, that is, move in reverse to the direction of movement or rotation as indicated by the arrow in FIG. 1 for the drum, such that the edge of the tape cut length 1*a* abuts the claws 33. The claws 33, therefore, physically prvent further movement of the tape cut length 1*a* on the periphery of the drum 3.

The cutting assembly, indicated generally at 60, is comprised of cutting assembly receiving drum 5 and cutting assembly stamping drum 6. The cutting assembly receiving drum 5, as well as the cutting assembly stamping drum 6, are freely revolving, axially supported cylindrical drums. These drums 5, 6 are placed in tandem and, as the successive cut lengths 1*a* of tape, each bearing a label, pass between them, their respective cutting surfaces come together to punch out irregular, that is, non-square, non-rectangular shaped labels from the rectangular cut length 1*a* of the tape. A die 51 is provided on the surface of drum 5, with the die being in the exact shape of the desired label. Outside, but close to the perimeter of die 51, there are provided several vacuum holes 52, FIG. 3, bored into the cylinder wall or periphery 5*a* of cutting assembly receiving drum 5, which holes 52 come into close proximity of the position adjusting drum 3 as the two drums 5, 3 rotate. The vacuum holes 52 are defined by passages internal of drum 5 which extend radially towards the center of the drum, then make a right angle turn downwardly to the lowest part of the drum 5, finally opening onto the bottom surface of drum 5. These passages are also identical to those shown in FIG. 7. Further, as seen in FIG. 1, an arcuate vacuum source hole 53 begins at a point in closest proximity to the position adjusting drum 3 and follows an arcuate path in excess of 180 degrees below drum 5 but opening to the bottom surface of drum 5. The vacuum source hole 53 follows the contour of drum 5 around to the point of closest proximity to the cutting assembly stamping drum 6 and slightly beyond the same, being placed just within the perimeter of the drum 5 and directly below that drum. As a result, vacuum pressure at vacuum hole 52 is created only when the position of the lower end of the passage to vaccum hole 52 rotates into overlying position respect to the vacuum source hole 53 subjected to a vacuum pressure from a vacuum pump or the like (not shown). The vacuum hole 52 is placed on the periphery of drum 5 outside of the perimeter of die 51 but a position within the area that is covered by the tape cut length 1*a* when it is received by drum 5. A punch blade or punch 61 of the same shape as the die 51 is mounted on the periphery 6*a* of stamping drum 6, FIG. 3, and several vacuum holes as at 62 open to the face of the punch 61 inside its perimeter which vacuum holes open to passages similar to those of FIG. 7 and which extend radially inwardly to a given extent and then make a right angle turn, terminating and opening to the bottom of drum 6. A vacuum source hole of arcuate configuration is shown in dotted lines in FIG. 1, underlying the bottom of the drum 6 and extending from a point of closest proximity to drum 5 to a point approximately 90 degrees therefrom to a point of closest proximity to pasting drum 4, the vacuum source hole 63 being supplied with a source of vacuum pressure so as to create a vacuum pressure at vacuum holes 62 only during the period in which those holes are in communication with the vacuum source hole 63 as the passages ride over that arcuate vacuum source hole. The vacuum pressure supplied to holes 62 acts on the label portion of the tape cut length 1*a* while the vacuum pressure supplied to vacuum holes 52 acts on the rim portion of the cut tape length 1*a* about the label during and after punch cutting of the label from the tape cut length 1*a*. This vacuum application is similar to that described for drums 3 and 5 and also for pasting drum 4 and separation drum 8, to be described more fully hereinafter.

As may be appreciated, the tape 1 is drawn from the tape source 10 and supplied to the cutting assembly 20 comprised of rotating cutter 2 and fixed position cutter 21, which in turn cuts the tape 1 at regular intervals and to cut lengths 1*a*. The cut lengths equal precisely the length of the imprinted label carried thereby and the tape 1 is synchronized with operation of the rotating cutter 2 to insure that the severance is between labels. Consequently, the labels are printed end to end with only a negligible gap separating successive labels. Each cut length 1*a* of tape 1 is vacuum adhered to drum 3 which picks up the cut length 1*a* supplied from cutter assembly 20. The position adjusting drum 3 transports the cut length 1*a* to the cutting assembly receiving drum 5, and the vacuum pressure to vacuum holes 33 is terminated when the cut length of tape on drum 3 passes the end of vacuum source hole 32, this allowing the label to slip back into a correct position where its trailing edge abuts claws 33, as may be seen by contrasting FIGS. 2 and 3. In this position, it is delivered to drum 5. The cut length 1*a* of tape revolves with the drum 3 to a position where the cut length is in close proximity to drum 5. The leading edge of the cut length 1*a* of the tape 1 is thus in correct position, and via accurate timing of rotation of drums 3 and 5, causes the cut length 1*a* to separate from drum 3 and to adhere to the periphery of drum 5 by the application of vacuum pressure to that drum periphery and holes 52 via vacuum source hole 53. The cut length 1*a* of the tape continues its travel on drum 5. When the cut length 1*a* comes to the point of closest proximity to the large cutting assembly stamping drum 6, it encounters the drum punch 61 which enters the recess of die 51 within the periphery or perimeter 5*a* of the cutting assembly receiving drum 5. The label is then cut from the cut length 1*a* of the tape to form separated label 11 and remaining waste tape cut length 12, FIG. 4. As may be appreciated from FIG. 4, the label 11 is almost exactly the same length as the cut length 1*a* of the tape from which it is cut. However, because of the position to which it is supplied by drum 3 to the periphery of drum 5, a completely accurate cutting of the label 11 from the tape cut length 1*a* is achieved by the interengagement of punch 61 and die 51, and this cutting action never fails to produce an accurately cut label 11.

Label 11, FIG. 4, is maintained by vacuum pressure on the punch 61 and is transferred to drum 6 during its rotation by vacuum pressure applied to vacuum holes 62 which are bored into the surface of the drum 6 within the perimeter proscribed by punch 61. The label 11 is transported by drum 6 until it reaches its next station as defined by pasting drum 4. On the other hand, the waste portion 12 of the cut length 1a of the tape 1 is held by vacuum pressure via vacuum holes 52 on the periphery 5a of the cutting assembly receiving drum 5 during the rotation of drum 5 until vacuum pressure is cut off by termination of communication between holes 52 and vacuum source hole 53, at hat point the waste portion 12 of the cut length 1a is collected as waste. As such, the method completely eliminates the necessity for a collecting spool to rewind and collect waste tape.

As may be appreciated, in the preferred embodiment of the process as illustrated by FIG. 1, label 11, which is vacuum adhered to the surface of drum 6 on punch 61 rotates such that it reaches a point of closest proximity to the pasting drum 4. Thereupon, the vacuum pressure is terminated at vacuum holes 62, since communication is cut off between those vacuum holes 62 and vacuum source hole 63. Label 11 transfers to the periphery of the pasting drum 4, having underlying the same a vacuum source hole 41 and which communicates with vacuum holes on the periphery of drum 4 (not shown) but under an arrangement identical to that of FIG. 7. A paste supply device as at 42 is positioned in proximity to the periphery of drum 4 so as to apply paste (not shown) on one side of label 11 as it passes on the periphery of drum 4 and in contact with paste applicator 42. The label, after paste application, rotates to a position where the labels 11 are supplied to the periphery of containers such as bottles M with the labels being applied in sequence as they pass on conveyor belt 43 at spaced positions correspondingly synchronized to the arrival of prepasted labels 11.

The above description related to the specific embodiment of the invention at FIG. 1 concerns one example in which drum 6 collects and transports labels 11, while drum 5 functions to collect and dispose of the waste portions 12 of the cut lengths 1a of the tape 1. Conversely, it is also possible to reverse the order and have drum 6 transport the waste portion of the cut tape lengths 1a while drum 5 transports the labels 11. Further, while the illustrated embodiment of FIG. 1 shows the label 11 and waste portions 12 of the cut length 1a of the tape 1 being separated at drums 5 and 6, which also perform the step of cutting the label, it is possible to separate the label from the waste portion of the cut length of the tape at a different stage.

Such alternative method of cutting and applying labels may be seen by reference to a further embodiment of the invention as illustrated in FIGS. 5, 6 and 7. In these figures, only a portion of the system is illustrated. Separation drum 8 is a freely rotating cylinder and is placed next to a punch-cut assembly similar to punch cut assembly 60. However, one which has no label/-waste portion of cut tape length separation capability. In such arrangement, drum 8 corresponds within a system to the position of drum 4 of the FIG. 1 embodiment. Vacuum holes 81 are bored into the peripheral surface 8a of revolving drum 8 within an area in which the label portion 11 of the cut length 1a of the tape covers as it is passed from the cutting assembly stamping drum 6 (not shown) to drum 8. Further, vacuum holes 82 are provided on the perihery 8a of the drum 8 around the perimeter of the surface area of that drum 8 against which the label 11 is vacuum adhered. The pressure applied to holes 82 functions, in this embodiment, to alternatively catch and actively release the waste portion 12 of the cut lengths 1a of the tape 1.

After the cut length 1a of the tape 1 is punch-cut at cutting assembly 5, 6, the label 11 and the waste portion 12 of the tape cut length 1a are transferred to drum 8. A vacuum is created at holes 81, and the vacuum extends from the point at which the tape is received to the point of closest proximity to the next station, in this case an arcuate support 90, FIG. 5, supporting containers or bottles M′ on whose periphery the labels 11 are to be adhesively fixed, after paste is applied in the manner of a paste application process step as evidenced in FIG. 1 by paste applicator 42. Those pasting aspects are not shown. However, the transfer process is readily evident by the proximity of carrier 90 for the bottles M′. In any case, at the other vacuum holes 82, a vacuum is created beginning from the same position as vacuum application to vacuum holes 81, to a point slightly past the point of closest proximity to the carrier 90 bearing the bottles M′. At this point, the vacuum is terminated, whereupon the label 11 transfers from drum 8 to the periphery of a bottle M′ by having its adhesive or paste covered surface in peripheral contact with that bottle M′. Vacuum source hole 84, which extends over an arcuate distance much greater than that of vacuum source hole 83, continues to supply vacuum pressure to the waste portion 12 of the cut length 1a bearing label 11, even after label 11 separates from the waste portion 12. As evidenced in FIG. 5, the waste portion 12 travels some distance away from carrier 90 to a point where the vacuum pressure is cut off at the termination of arcuate vacuum source hole 84, communication from those holes 82 via internal passage 82a, FIG. 7, and that passage 82a at its lower end at the bottom of drum 8 aligns itself with a positive pressure source of air hole 85, whereupon the waste portion 12 of the tape cut length 1a separates from the periphery of drum 8, as per FIG. 5.

As may be appreciated in FIG. 7, and with the corresponding being true for the other drums of the various embodiments, passage 81a extends at right angles radially inwardly from vacuum holes 81 on the periphery 8a of drum 8 and then turns downwardly to the lowermost part of drum 8 and opens to its bottom surface in line with vacuum source hole 83, when the drum 8 rotates so that such alignment occurs as evidenced in FIG. 7.

Instead of the drum style cutting assembly 60, FIG. 1, it is also possible to use a double sided punch cutter. In this case, the cut length 1a of the tape 1 is fed into a position between two cutting planes (a die and cutter of the same shape), and one of the surfaces moves forward and backward alternately punching and releasing the tape. With the various embodiments of the invention, the cutting of the tape 1 into segements or cut lengths 1a and the punching of labels 11, are completely separate operations. Advantageous results occur. Because the tape is already cut when it reaches the label punching station, the width of the waste tape portion 12 left between label punches and between the upper and lower edges of the tape cut length 1a and the label 11, is no longer a critical concern. These widths may be reduced to almost zero, which means a dramatic reduction in the amount of waste generated. After the tape 1 is cut, what happens to the waste portion 12 of the tape cut length 1*a* is not left to chance. The separate of the waste portion 12 of the cut length 1*a* of tape 1 from the label 11 is 100% accurate. Unlike the previous systems, there is eliminated any jamming or tearing that can force production to a stop. The method and apparatus may be applied to numerous types of belt shaped tape punching machinery. For example, strip metal and wood strip cutting and punching in a manner which is effective from the point of view of both cost and production speed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of cutting and supplying labels of non-rectangular shape form a tape bearing multiple labels with minimal waste during cutting, said method comprising:

severing said tape at intervals into precise lengths of cut tape generally equal in length to that of the desired label, precisely placing each of said cut lengths of tape within a punch cutting assembly and punching said cut length of tape to sever said label of non-rectangular configuration from the waste portion of the cut length, separating said label from said waste portion about the rim of said label after punching, and delivering said label free of said waste portion.

2. The method as claimed in claim 1, wherein said punch-cutting assembly is remote from the area of severing of said tape at intervals into precise lengths of cut tape and wherein said method further comprises the step of placing each cut length on the periphery of a transfer drum for transfer of the cut lengths from the area of severance of the cut length from said tape and to said punch-cutting assembly, and wherein said transfer drum includes stops on the periphery of the drum, and wherein said process includes the step of placing said cut length on the periphery of the transfer drum under vacuum pressure and relieving said vacuum pressure to allow the cut length to shift circumferentially on the drum periphery into edge contact with said stops to thereby precisely locate the cut length on the periphery of the drum and to synchronize its movement into the punch-cutting assembly.

3. The method as claimed in claim 1, wherein said punch-cutting device comprises a pair of drums rotating side by side, one of said drums bearing a die, the other of said drums bearing a punch movable into said die during relative drum rotation, and wherein said method comprises the step of selectively applying vacuum pressure to the periphery of the drum punch and about the perimeter of the die, and wherein said method comprises the step of maintaining vacuum pressure subsequent to punching of the label from the waste portion of the cut length of tape such that the cut length of tape waste portion remains adhered to the periphery of the drum bearing the die, while the label remains adhered to the punch by vacuum pressure and rotates therewith so as to separate the label from the waste portion of the cut length of tape subsequent to punching.

4. The method as claimed in claim 2, wherein said punch-cutting device comprises a pair of drums rotating side by side, one of said drums bearing a die, the other of said drums bearing a punch movable into said die during relative drum rotation, and wherein said method comprises the step of selectively applying vacuum pressure to the periphery of the drum punch and about the perimeter of the die, and wherein said method comprises the step of maintaining vacuum pressure subsequent to punching of the label from the waste portion of the cut length of tape such that the cut length of tape waste portion remains adhered to the periphery of the drum bearing the die, while the label remains adhered to the punch by vacuum pressure and rotates therewith so as to separate the label from the waste portion of the cut length of tape subsequent to punching.

* * * * *